(12) United States Patent
Chang

(10) Patent No.: US 7,768,595 B2
(45) Date of Patent: Aug. 3, 2010

(54) DISPLAY DEVICE

(75) Inventor: Jae-Hyuk Chang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 878 days.

(21) Appl. No.: 11/620,853

(22) Filed: Jan. 8, 2007

(65) Prior Publication Data

US 2007/0279558 A1    Dec. 6, 2007

(30) Foreign Application Priority Data

May 30, 2006  (KR) ................. 10-2006-0048480

(51) Int. Cl.
*G02F 1/1335*    (2006.01)
(52) U.S. Cl. ................... 349/66; 359/230
(58) Field of Classification Search .......... 349/64, 349/69, 66; 359/230–231
See application file for complete search history.

(56) References Cited

U.S. PATENT DOCUMENTS

| | | | |
|---|---|---|---|
| 5,959,763 A | 9/1999 | Bozler et al. | |
| 6,127,908 A | 10/2000 | Bozler et al. | |
| 6,313,937 B1 | 11/2001 | Dowe et al. | |
| 6,396,620 B1 | 5/2002 | Goodwin-Johansson | |
| 6,586,738 B2 | 7/2003 | Dausch et al. | |
| 6,646,525 B2 | 11/2003 | Bozler et al. | |
| 6,734,930 B2 * | 5/2004 | Yu et al. | 349/69 |
| 6,888,142 B2 | 5/2005 | Pizzi et al. | |
| 6,972,889 B2 | 12/2005 | Goodwin-Johansson et al. | |
| 2006/0033938 A1 | 2/2006 | Kopf et al. | |

FOREIGN PATENT DOCUMENTS

| | | |
|---|---|---|
| JP | 06-250593 | 9/1994 |
| JP | 11-231233 | 8/1999 |
| JP | 2000-221430 | 8/2000 |
| KR | 1020020034875 | 5/2002 |
| KR | 2004-071163 | 8/2004 |

\* cited by examiner

*Primary Examiner*—James A Dudek
(74) *Attorney, Agent, or Firm*—F. Chau & Associates, LLC

(57) ABSTRACT

A display device includes a substrate, a pixel electrode formed on the substrate and allowing light to be transmitted therethrough, a micro-shutter electrode formed on the pixel electrode to be opened and closed, and a reflection preventing layer formed on an upper surface of the micro-shutter electrode. Because the reflection preventing layer is formed on the upper surface of the micro-shutter electrode to prevent light incident thereon from being reflected to be leaked out, the black color does not dim the display, thereby increasing the contrast ratio (CR), and sharpness is not degraded when displaying colors.

7 Claims, 5 Drawing Sheets

DISPLAY DEVICE

CROSS-REFERENCE TO RELATED APPLICATION

This application claims priority to and the benefit of Korean Patent Application No. 10-2006-0048480 filed on May 30, 2006, the disclosure of which is incorporated by reference in its entirety.

BACKGROUND OF THE INVENTION

1. Technical Field

The present disclosure relates to a display device using a micro-shutter.

2. Discussion of the Related Art

Display device technology is evolving from the existing cathode ray tube (CRT) display device that uses a CRT method to a flat panel display device such as a liquid crystal display (LCD) device and a plasma display panel (PDP) device. The CRT display device displays images by making electron beams collide with a phosphor material. However, the CRT display device has shortcomings in that it is limited in increasing a size of its screen because its depth also increases as the size of screen increases.

In order to overcome the shortcomings of the CRT display device, several types of flat panel display devices have been developed. The LCD device and the PDP device are typical flat panel display devices. The flat panel display devices are advantageous in that they can be increased in size without increasing their depth, and as such they can be mounted on a wall.

However, the LCD device can have a slow response time and the PDP device may have high power consumption.

Due to the possibility of slow response time and high power consumption of the existing flat panel display devices such as the LCD device and the PDP device, a new type of flat panel display device is needed.

SUMMARY OF THE INVENTION

Exemplary embodiments of the present invention provide a display device using a micro-shutter capable of enhancing a contrast ratio.

In an exemplary embodiment of the present invention, a display device includes a substrate, a pixel electrode formed on the substrate and allowing light to be transmitted therethrough, a micro-shutter electrode formed on the pixel electrode such that it can be opened and closed, and a reflection preventing layer formed on an upper surface of the micro-shutter electrode.

The pixel electrode and the micro-shutter electrode may be insulated from each other and receive their signals through separate wiring.

The micro-shutter electrode may be opened and closed by electrostatic force with the pixel electrode, and an opening degree of the micro-shutter electrode can be controlled according to the electrostatic force to thereby control an amount of transmitted light.

The reflection preventing layer can be an oxide layer.

The oxide layer may be formed by ashing the micro-shutter electrode or by performing a surface treatment on the micro-shutter electrode using nitric acid.

The display device may further include a fixed electrode for fixing the micro-shutter electrode and applying a signal to the micro-shutter electrode.

The display device may further include a backlight unit positioned at a lower side of the substrate and providing light to the substrate.

In an exemplary embodiment of the present invention, a display device includes a thin film transistor array panel including a first substrate, a pixel electrode formed on the first substrate and allowing light to be transmitted therethrough, a micro-shutter electrode formed on the pixel electrode such that it can be opened and closed, and a reflection preventing layer formed on an upper surface of the micro-shutter electrode a countering panel including a second substrate facing the first substrate, a color filter, a black matrix, and a common electrode and a liquid crystal layer interposed between the thin film transistor array panel and the countering panel.

The display device may further include an insulating layer formed between the pixel electrode and the micro-shutter electrode, and an alignment layer formed between the insulating layer and the micro-shutter electrode.

BRIEF DESCRIPTION OF THE DRAWINGS

Exemplary embodiments of the present of the invention can be understood in more detail from the following descriptions taken in conjunction with the accompanying drawings, in which.

DESCRIPTION OF THE EXEMPLARY EMBODIMENTS

Figure 1:
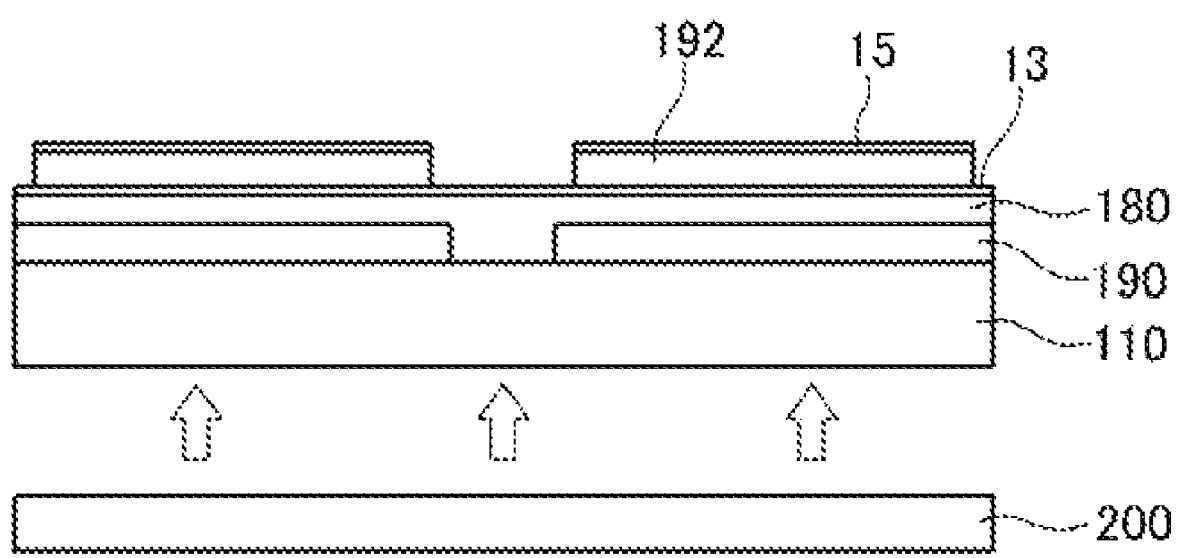
FIG. 1 is a sectional view of a display device when a micro-shutter electrode is closed according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein.

In the drawings, the thickness of layers, films, panels, regions, etc., are exaggerated for clarity. Like reference numerals designate like elements throughout the specification.

A display device according to an exemplary embodiment of the present invention will be described in detail with reference to FIGS. 1 and 2.

Figure 2:
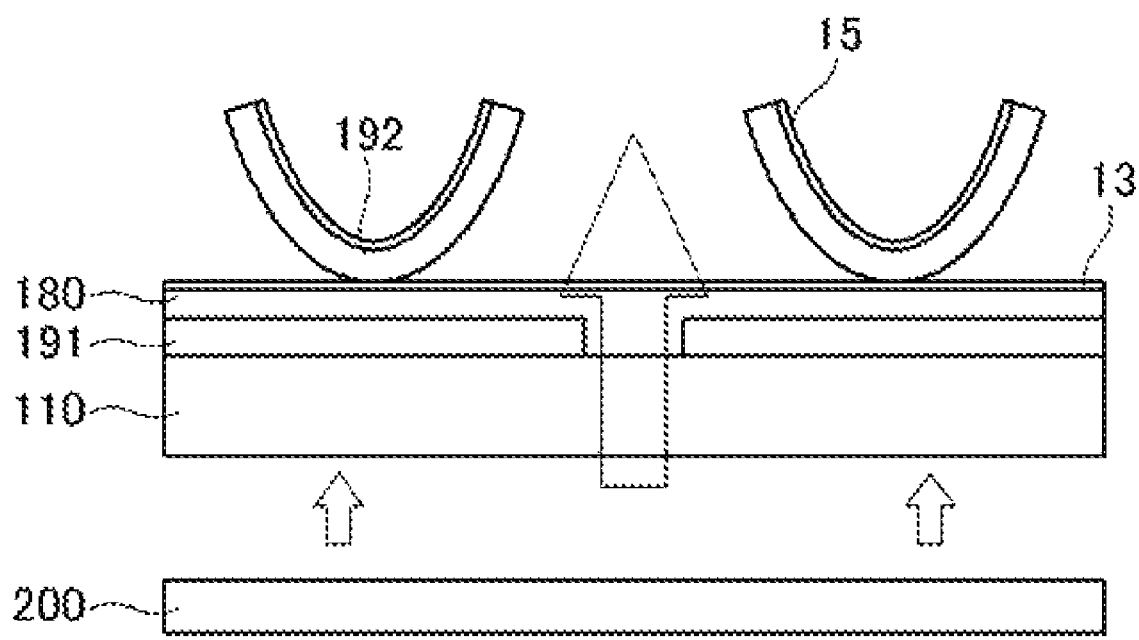
FIG. 2 is a sectional view of the display device when the micro-shutter electrode is opened according to an exemplary embodiment of the present invention.

FIG. 1 is a sectional view of a display device when a micro-shutter electrode is closed according to an exemplary embodiment of the present invention, and FIG. 2 is a sectional view of the display device when the micro-shutter electrode is opened according to an exemplary embodiment of the present invention.

In an exemplary embodiment of the present invention, the display device illustrated in FIGS. 1 and 2 displays images by using liquid crystal layer. That is, the substrate shown in FIGS. 1 and 2 refers to a lower thin film transistor (TFT) array panel, without a countering panel or a liquid crystal layer interposed between the TFT array panel and the countering panel. The countering panel may be, for example, and upper color filter array.

The LCD device according to an exemplary embodiment includes the TFT array panel and a countering panel (not shown) formed facing the TFT array panel, a substrate spacer (not shown) for uniformly supporting a gap between the two display panels, and a liquid crystal layer (not shown) interposed between the two display panels.

Gate lines (not shown) and data lines (not shown) are formed to cross each other to define unit pixel areas in a matrix on the TFT array panel. A TFT connected with the gate line and the data line and a pixel electrode electrically connected with the TFT are provided in each pixel area. The pixel electrode is formed of a transparent conductive layer. A micro-shutter electrode 192 is formed at an upper portion of the pixel electrode 190 such that it can be opened and closed, and a passivation layer 180 is formed between the transparent pixel electrode 190 and the micro-shutter electrode 192 to insulate the pixel and micro-shutter electrodes from each other. A reflection preventing layer 15 is formed on the micro-shutter electrode 192 to prevent light incident from the outside from being reflected, thereby enhancing the contrast ratio (CR) of the display device.

Meanwhile, black matrixes (not shown) having an opening corresponding to the pixel area are formed on the countering panel that faces the TFT array panel, and red, green, and blue color filters (not shown) are formed at each pixel area. The color filters may be covered with an upper passivation layer (not shown) formed of an organic insulating material, and a common electrode (not shown) can be formed on the upper passivation layer.

A backlight unit 200 is positioned at a lower side of the TFT array panel, providing light to the liquid crystal panel. Light emitted from the backlight unit 200 can be cut off by or transmitted through the micro-shutter electrode, a polarizer, and the liquid crystal layer to display an image. In particular, a lamp of the backlight unit 200 can be controlled to be turned on or off according to opening or closing of the micro-shutter electrode 192.

The section of the LCD device according to an exemplary embodiment will be now described with reference to FIGS. 1 and 2.

The TFT ray panel includes a substrate 110. A plurality of gate lines (not shown) is formed to extend mainly in a horizontal direction on the substrate 110. The gate lines may be formed as a single layer formed of a material with low resistivity, for example, silver, a silver alloy, aluminum and/or an aluminum alloy. Also, the gate lines can be formed as a multi-layer including at least one layer containing the aforementioned material and at least one layer as a pad with good contact characteristics with a different material. An example of the multi-layer can be a double layer of aluminum and a molybdenum alloy. An end portion of each gate line transfers a gate signal from the outside to the gate lines, and a plurality of branches of the respective gate lines forms gate electrodes of the TFT.

A gate insulating layer (not shown) formed of, for example, silicon nitride (SiNx), etc., covers the gate lines.

A semiconductor layer (not shown) formed of hydrogenated amorphous silicon or the like is formed on the gate insulating layer formed at the upper portion of the gate electrode, and pairs of ohmic contact layers (not shown) formed of silicide of n+ hydrogenated amorphous silicon in which an n-type impurity is doped are formed at an upper portion of the semiconductor layer. Respective pairs of ohmic contact layers are separated centering on the gate electrode.

The plurality of data lines (not shown) and a plurality of drain electrodes (not shown) are formed on the ohmic contact layers and the gate insulating layers. The data line and the drain electrode include a conductive layer formed of a conductive material with low resistivity such as aluminum or silver. The data lines extend mainly in the vertical direction to cross the gate lines. A plurality of branches of the data lines extend up to an upper portion of one of each pair of ohmic contact layers to form a source electrode of the TFT. Each end portion of the data lines transfers image signals received from the outside to the data lines. A drain electrode of each TFT is separated from data lines and positioned at an upper portion of the ohmic contact layer at the opposite side of the source electrode with respect to the gate electrode.

A lower passivation layer (not shown) formed of silicon nitride or an organic material with good planarization characteristics is formed on the upper portions of the data lines, the data electrode, and the semiconductor layer that is not covered by the data lines and the data electrode.

The pixel electrodes 190 are formed on the lower passivation layer, and are electrically connected with the drain electrode through a contact hole and positioned at the pixel areas. The pixel electrodes 190 are formed of indium tin oxide (ITO) or indium zinc oxide (IZO), etc., which are transparent conductive materials.

An upper passivation layer 180 is formed on the pixel electrodes 190, and a plurality of micro-shutter electrodes 192 are formed on the upper passivation layer 180. The micro-shutter electrodes 192 are formed to receive signal through separate wiring and are controlled to be opened as shown in FIG. 2 or shut as shown in FIG. 1.

Preferably, the micro-shutter electrodes 192 are opened or shut such that they are pushed to be bent up by electrostatic force according to a voltage relationship with an ambient conductor, in particular the pixel electrode 190, or are tightly attached on the upper passivation layer 180 according to attraction. The micro-shutter electrodes 192 can be formed as a plurality of layers, each with a different expansion coefficient, so that they can be opened or shut.

Preferably, the upper passivation layer 180 is formed of a material that can induce an electrostatic force to open and shut the micro-shutter electrodes 192.

A reflection preventing layer 15 is formed on the micro-shutter electrode 192. The reflection preventing layer 15 can be formed as a layer that absorbs light. An oxide layer can be formed as the reflection preventing layer to obtain the effect of preventing light reflection. The formation of the oxide layer as the reflection preventing layer is advantageously easy compared with a process of forming a separate layer. In order to form the oxide layer, a method of ashing the micro-shutter electrode 192 through a dry process or a method of performing surface-treatment on the micro-shutter electrode 192 by using nitric acid through a wet process can be employed.

A lower alignment layer 13 is formed on the upper portion of the upper passivation layer 180 and on the lower portion of the micro-shutter electrode 192, namely, between the upper passivation layer 180 and the micro-shutter electrode 192, and a liquid crystal layer is formed to be aligned in a certain direction thereon. An alignment layer can be also formed at an upper portion of the micro-shutter electrode 192, and in this case, the alignment layer is preferably formed on the reflection preventing layer 15.

The liquid crystal layer interposed between the TFT array panel and the countering panel can having a TN or VA mode, and the LCD device is preferably formed as a normally black type.

A display method for the display device according to an exemplary embodiment of the present invention will now be described with reference to FIGS. 1 and 2.

When the display device is in an OFF state, the micro-shutter electrode 192 is shut as shown in FIG. 1. In this case, the backlight unit 200 is generally turned off, but even when the backlight unit 200 is turned on, light cannot leak out owing to the micro-shutter electrodes 192 and black matrixes (not shown) of the countering panel (not shown). In addition, although light incident from the outside is incident on the reflection preventing layer 15 of the micro-shutter electrode 192, it cannot be reflected so that the corresponding portion is seen as black.

When the display device displays an image, the micro-shutter electrodes 192 are opened as shown in FIG. 2. Then, light provided from the backlight unit 200 passes through the pixel electrode 190 between the micro-shutter electrodes 192, and when the light transmits through the liquid crystal layer (not shown) its polarization direction is changed to display an image. A polarizer (not shown) is attached at the side surface of the liquid crystal panel to allow or not allow light with a polarization direction that has been changed while passing through the liquid crystal layer to be transmitted therethrough.

Even when the micro-shutter electrodes 192 are opened, light incident from the outside is incident on an upper surface of the micro-shutter electrodes 192, and in this case, because the reflection preventing layer 15 is formed on the micro-shutter electrode 192, sharpness of a displayed image cannot be degraded. In addition, when a black color is displayed, it cannot become dim, thus preventing reduction of the contrast ratio (CR).

Figure 3:
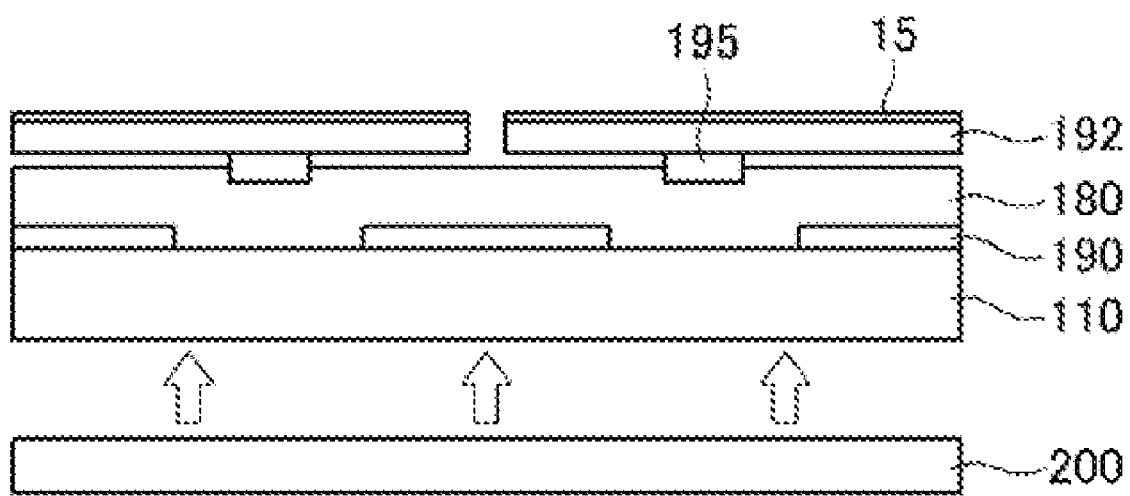
FIG. 3 is a sectional view of a display device when a micro-shutter electrode is closed according to an exemplary embodiment of the present invention.
Figure 4:
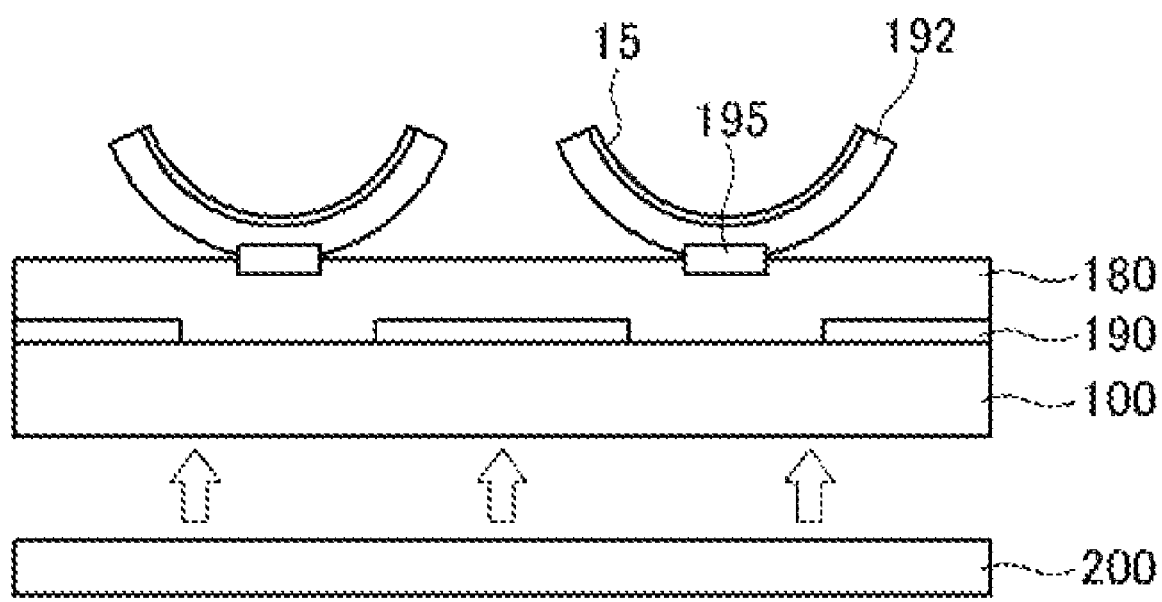
FIG. 4 is a sectional view of the display device when the micro-shutter electrode is opened according to an exemplary embodiment of the present invention.

FIG. 3 is a sectional view of a display device when a micro-shutter electrode is shut according to an exemplary embodiment of the present invention, and FIG. 4 is a sectional view of the display device when the micro-shutter electrode is opened according to an exemplary embodiment of the present invention.

An exemplary embodiment of the present invention illustrated in FIGS. 3 and 4 shows a display device in which an amount of transmitted light is controlled by opening and shutting the micro-shutter electrode 192. Thus, the display device does not require a liquid crystal layer. A color filter can be formed by using a separate substrate or can be formed on a substrate where the micro-shutter 192 is formed. In the case where the color filter is formed on the substrate where the micro-shutter 192 is formed, the color filter is preferably positioned at a lower side of the micro-shutter electrode 192.

In FIG. 3, the micro-shutter electrodes 192 are shut. In detail, a wiring (not shown) for applying signals to the pixel electrodes 190 and the micro-shutter electrode 192 is formed on the substrate 110. The wiring can have a structure such that wires (lines) are formed to cross each other to define unit pixel areas in a matrix, and a switching element such as the TFT for applying a signal to the pixel electrode 190 and the micro-shutter electrode 192 can be formed.

The pixel electrode 190 is formed of a transparent conductive layer to allow light provided from the backlight unit 200 to be transmitted therethrough. The micro-shutter electrode 192 is formed of a material that can cut off light provided from the backlight unit 200, preferably a material that is suitable to be opened and shut by electrostatic force, and can include a plurality of layers each with a different expansion coefficient so as to be opened or shut. For example the micro-shutter electrode 192 can be formed of a metal material with conductivity, for example, molybdenum (Mo) and/or copper (Cu).

A passivation layer 180 is formed between the pixel electrodes 190 and the micro-shutter electrodes 192 to insulate them.

The micro-shutter electrodes 192 are electrically connected with fixed electrodes 195 formed on the passivation layer 180, and receive signals through the fixed electrode 195. When the micro-shutter electrode 192 is opened or shut, the portion that is connected with the fixed electrode 195 of the micro-shutter electrode 192 is still fixed, while other portions of the micro-shutter electrode 192 are opened or shut. The fixed electrode 195 can be formed at the central portion of the micro-shutter electrode 192, or positioned at a side portion of the micro-shutter electrode 192 such that the micro-shutter electrode 192 can be opened and shut.

When the micro-shutter electrode 192 is shut, light cannot be transmitted upward, so the black color is displayed, and when the micro-shutter electrode 192 is opened, light is transmitted upward to display a white color. Gray levels are represented by controlling an opening degree of the micro-shutter electrode 192. In order to display colors, a separate color filter is formed to allow light to be transmitted therethrough.

Preferably, the micro-shutter electrodes 192 are opened or shut such that they are pushed to be bent up by electrostatic force due to a voltage difference between the pixel electrodes 190 and the micro-shutter electrodes 192, or tightly attached on the upper passivation layer 180 according to attraction, and the opening degree of the micro-shutter electrodes 192 are controlled according to the electrostatic force. In this respect, the micro-shutter electrode 192 is preferably formed with an appropriate thickness so it can be pushed to be bent up, and preferably, for example, the micro-shutter electrode 192 can have a thickness of about 2 μm or less.

A reflection preventing layer 15 is formed on an upper surface of the micro-shutter electrodes 192. Preferably, the reflection preventing layer 15 is formed as a layer that absorbs light. For example, a metal oxide layer is formed as the reflection preventing layer on the surface of the micro-shutter electrode 192 to obtain the effect of preventing light reflection. The formation of the oxide layer as the reflection preventing layer is advantageously easy compared with a process of forming a separate layer. Namely, the oxide layer can be simply formed by a method of ashing the micro-shutter electrode 192 by using oxygen through a dry process or a method of performing surface-treatment on the micro-shutter electrode 192 by using nitric acid, sulfuric acid, or hydrogen peroxide, etc., through a wet process. As the surface of the micro-shutter electrode 192 is oxidized, the oxide layer is formed on the surface of the micro-shutter electrode 192 to be used as the reflection preventing layer 15.

When the black color is displayed with the micro-shutter electrode 192 shut, light incident from the outside cannot be reflected to be leaked out because of the presence of the reflection preventing layer 15, so the black color cannot be seen dim and thus the contrast ratio (CR) can increase.

Also, when an image is displayed with the micro-shutter electrode 192 opened, light incident from the outside cannot be reflected, and thus sharpness of a displayed image cannot be degraded.

The reflection preventing layer 15 can also be formed on the lower surface of the micro-shutter electrode 192, as necessary, to prevent light incident from the backlight unit 200 from being reflected and leaked out.

The backlight unit 200 is positioned at a lower side of the TFT substrate and provides light to the display panel. Light emitted from the backlight unit 200 can be cut off by or transmitted through the micro-shutter electrode, to display an image. In particular, a lamp of the backlight unit 200 can be controlled to be turned on or off according to opening or shutting of the micro-shutter electrode 192. That is, when the micro-shutter electrode 192 is shut, although the lamp is turned on light cannot be transmitted, and the lamp can also be formed to be turned of.

Figure 5:
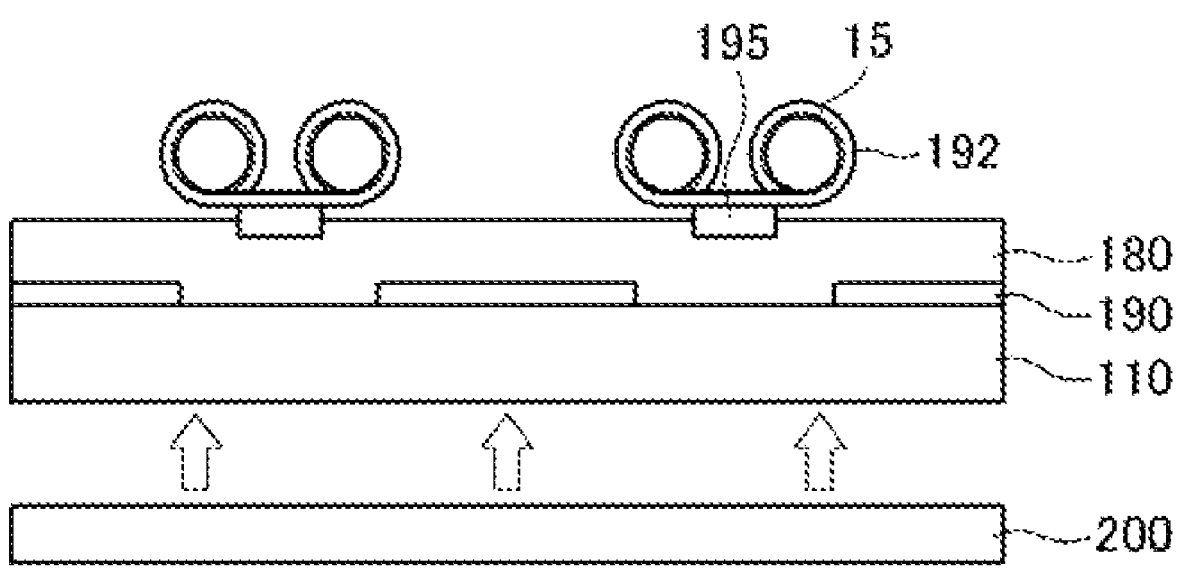
FIG. 5 is a sectional view of a display device in which a micro-shutter electrode is in an opened state according to an exemplary embodiment of the present invention.

FIG. 5 is a view of a display device in which a micro-shutter electrode is in an opened state according to an exemplary embodiment of the present invention.

As shown in FIG. 5, the micro-shutter electrode 192 is in an opened state. In this case, the micro-shutter electrode 192 is rolled up to be opened. The reflection preventing layer 15 is formed on a surface of the micro-shutter electrode 192.

In addition, with reference to FIGS. 2, 4, and 5, the central portion of the micro-shutter electrode 192 is fixed while the peripheral portion is opened upward, and in this respect, a structure in which one end of the micro-shutter electrode 192 is fixed while the other end is opened can also possibly be implemented.

As described above, in the display device in which the micro-shutter electrodes are formed, by forming the reflection preventing layer on the upper surface of the micro-shutter electrodes, the contrast ratio (CR) of the display device can be enhanced, and in addition, because the reflection preventing layer is formed as the oxide layer, the effect of preventing light reflection can be obtained through the simple process.

Although the illustrative exemplary embodiments of the present invention have been described herein with reference to the accompanying drawings, it is to be understood that the present invention should not be limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device comprising:
   a substrate;
   a pixel electrode formed on the substrate and allowing light to be transmitted therethrough;
   a micro-shutter electrode formed on the pixel electrode, wherein the micro-shutter electrode is capable of opening and closing;
   a fixed electrode to fix the micro-shutter electrode and to apply a signal to the micro-shutter electrode; and
   a reflection preventing layer formed on an upper surface of the micro-shutter electrode,
   wherein the fixed electrode contacts a center portion of the micro-shutter electrode.

2. The device of claim 1, wherein the pixel electrode and the micro-shutter electrode are insulated from each other, and the pixel electrode and the micro-shutter electrode receive a signal through separate wiring.

3. The device of claim 1, wherein the micro-shutter electrode is opened and closed by the electrostatic force with the pixel electrode, and an opening degree of of the micro-shutter electrode is controlled according to the electrostatic force to control an amount of transmitted light.

4. The device of claim 1, wherein the reflection preventing layer is an oxide layer.

5. The device of claim 4, wherein the oxide layer is formed by ashing the micro-shutter electrode or performing surface-treatment on the micro-shutter electrode using nitric acid.

6. The device of claim 1, further comprising:
   a fixed electrode to fix the micro-shutter electrode and to apply a signal to the micro-shutter electrode.

7. The device of claim 1, further comprising:
   a backlight unit positioned at a lower side of the substrate and providing light to the substrate.

* * * * *